(12) United States Patent
LeClair

(10) Patent No.: US 7,506,393 B1
(45) Date of Patent: Mar. 24, 2009

(54) PLANE MAGIC A.K.A. POOL PLANE

(75) Inventor: Gerald Joseph LeClair, W. Melbourne, FL (US)

(73) Assignee: Gerald J. LeClair, W. Melbourne, FL (US)

( * ) Notice: Subject to any disclaimer, the term of this patent is extended or adjusted under 35 U.S.C. 154(b) by 0 days.

(21) Appl. No.: 11/635,463

(22) Filed: Dec. 7, 2006

Related U.S. Application Data

(60) Provisional application No. 60/755,450, filed on Jan. 3, 2006.

(51) Int. Cl.
*E04H 4/16* (2006.01)

(52) U.S. Cl. ............................. 15/1.7; 15/246
(58) Field of Classification Search .................. 15/1.7, 15/246; 114/222
See application file for complete search history.

(56) References Cited

U.S. PATENT DOCUMENTS

| | | | |
|---|---|---|---|
| 4,637,087 A | 1/1987 | Feinberg | |
| 4,733,427 A | 3/1988 | Conrad | |
| 4,742,592 A | 5/1988 | Addona, Sr. | |
| 4,783,868 A | 11/1988 | O'Collaghon | |
| 4,909,173 A * | 3/1990 | Strong | 114/222 |
| 4,962,558 A | 10/1990 | Harrell | |
| 5,487,397 A | 1/1996 | Bean | |
| 5,864,917 A | 2/1999 | Landsman | |
| 5,983,431 A | 11/1999 | Meshulam | |
| 6,301,737 B1 | 10/2001 | Morse | |
| 6,668,413 B2 | 12/2003 | Fortier | |
| 2004/0060129 A1 * | 4/2004 | Juett | 15/1.7 |

* cited by examiner

*Primary Examiner*—Mark Spisich
(74) *Attorney, Agent, or Firm*—Gerald J. LeClair

(57) ABSTRACT

A cambered hydrofoil for mounting to a pool pole that uses a mounting collar to transfer hydrodynamic force to the pole and thus increase scrubbing action of the brush attached to the end of said pole. The assembly consists of a left and right hydrofoil (15, 21), left and right hydrofoil threaded pivots (22, 26), left and right ball-nosed spring plungers (16, 20), mounting collar (17) locking screws (19, 25) for fixing its position on the pole and collar dimples (18, 24, 45 and 46) that work with the spring plungers to hold the planes at the proper angle for either pool side or pool bottom brushing.

1 Claim, 7 Drawing Sheets

Exploded View of Plane Magic Assembly showing Left Hydrofoil 15, Right Hydrofoil 21, Mounting Collar 17 and Associated Hardware Isometric View of Plane Magic mounted to Pole

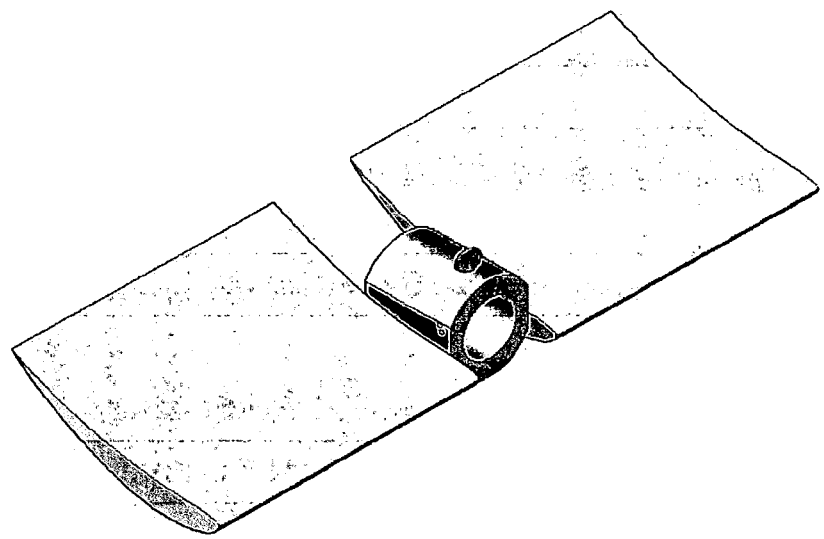
Figure 1 Isometric view of the complete "Plane Magic" assembly
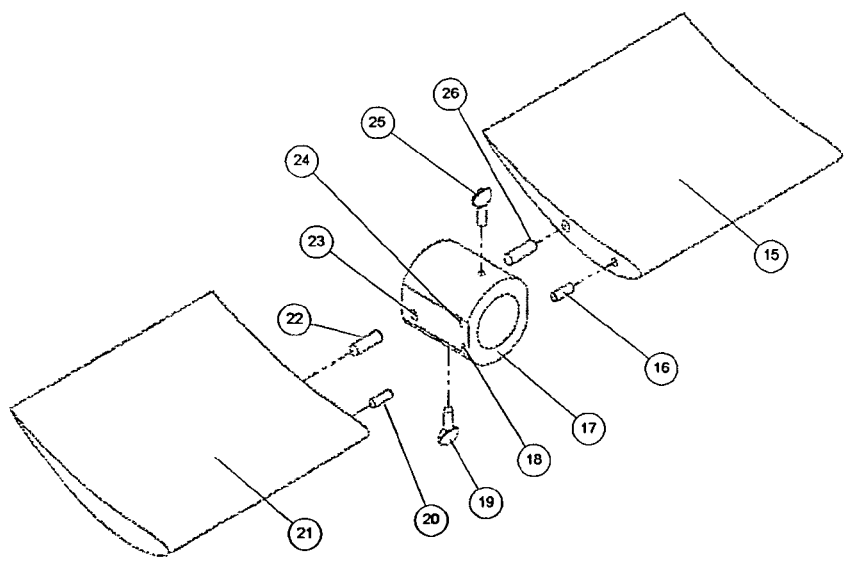
Figure 2 – Exploded View of Plane Magic Assembly showing Left Hydrofoil 15, Right Hydrofoil 21, Mounting Collar 17 and Associated Hardware

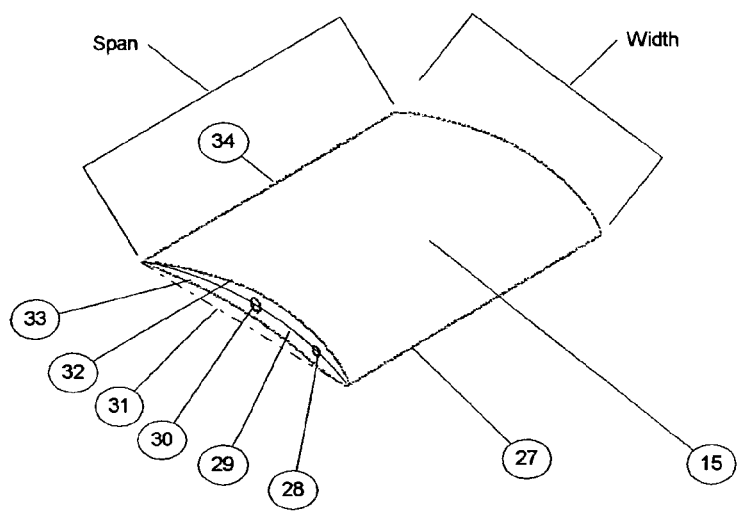
Figure 3 – Isometric View of Left Hydrofoil 15 showing left hydrofoil leading edge 27, left hydrofoil spring plunger threaded blind hole 28, left hydrofoil mean camber line 29, left hydrofoil threaded pivot blind hole 30, left hydrofoil chord 31, left hydrofoil Eppler 423 upper curved surface 32, and left hydrofoil Eppler 423 lower curved surface 33

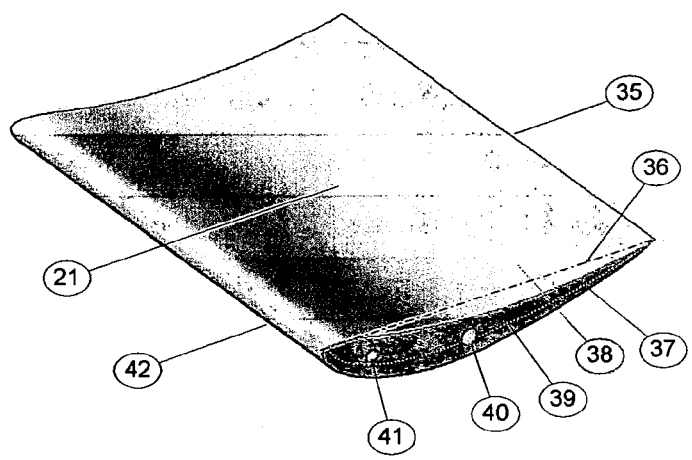
Figure 4 – Isometric View of Right Hydrofoil 21 showing the trailing edge 35, right hydrofoil chord 36, Eppler 423 lower curved surface 37, Eppler 423 upper curved surface 38 , right hydrofoil mean camber line 39, right hydrofoil threaded pivot blind hole 40, right hydrofoil ball nose spring plunger threaded blind hole 41 and the right hydrofoil leading edge 42.

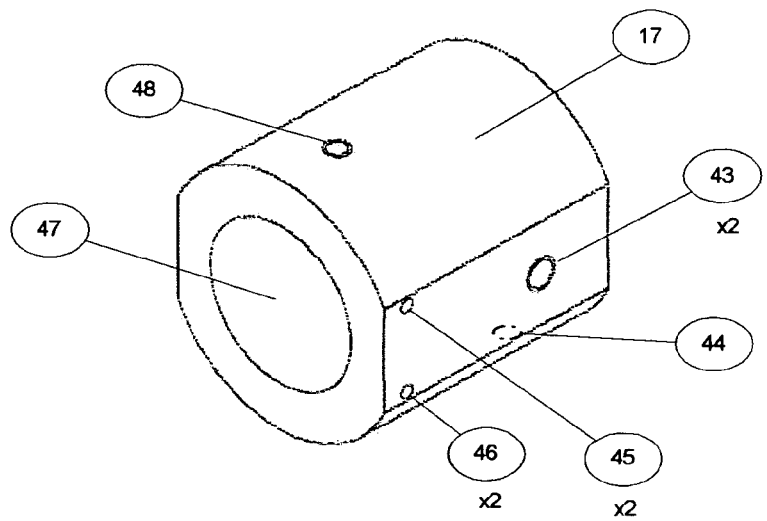

Figure 5 – Isometric view of mounting collar 17, showing mounting collar left hydrofoil pivot hole 43, mounting collar lower locking screw threaded through hole threaded pivot hole 44, mounting collar left hydrofoil spring plunger upper blind hole 45, mounting collar left hydrofoil spring plunger lower blind hole 46, mounting collar pole mount through hole 47 and mounting collar upper locking screw threaded through hole 48.

Figure 6 – Left and Right Hydrofoil Pivot 26, 22

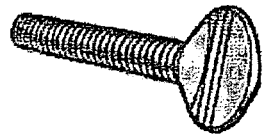

Figure 7 – Upper and Lower Collar Locking Screw 25, 19

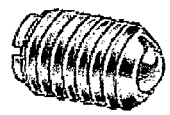
Figure 8 Left and Right Hydrofoil Ball-Nose Spring Plunger 16, 20
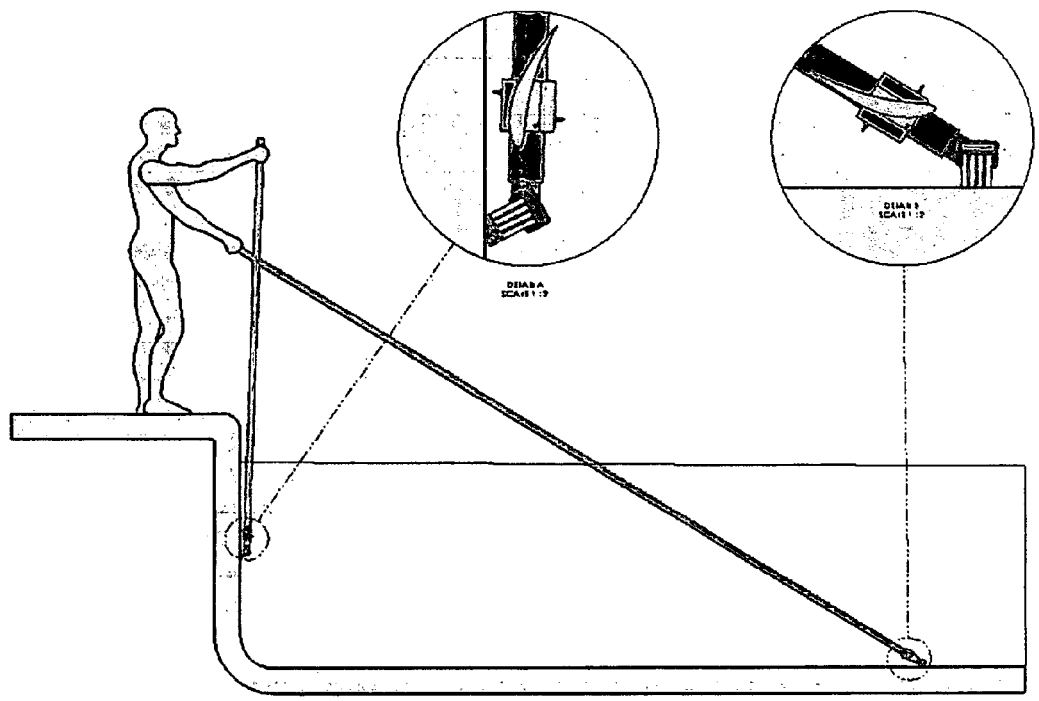
Figure 9 Diagram of Hydrofoil Magic Mounted to Pool Brush Held in Operating Positions

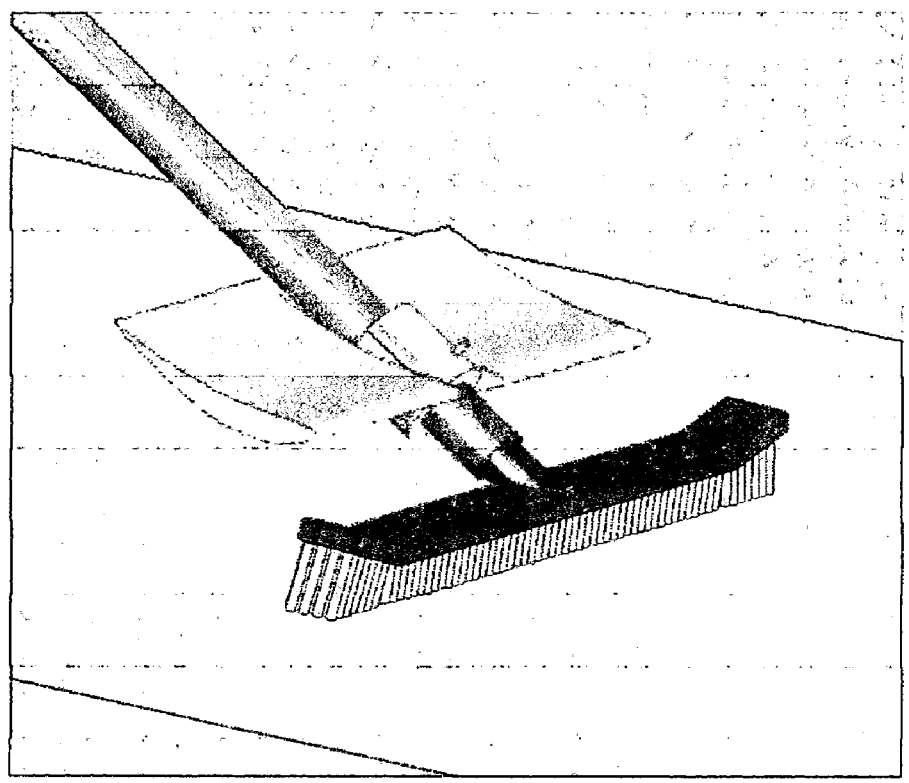
Figure 10 Isometric View of Plane Magic mounted to Pole Angled correctly (+15°) for cleaning Pool Bottom
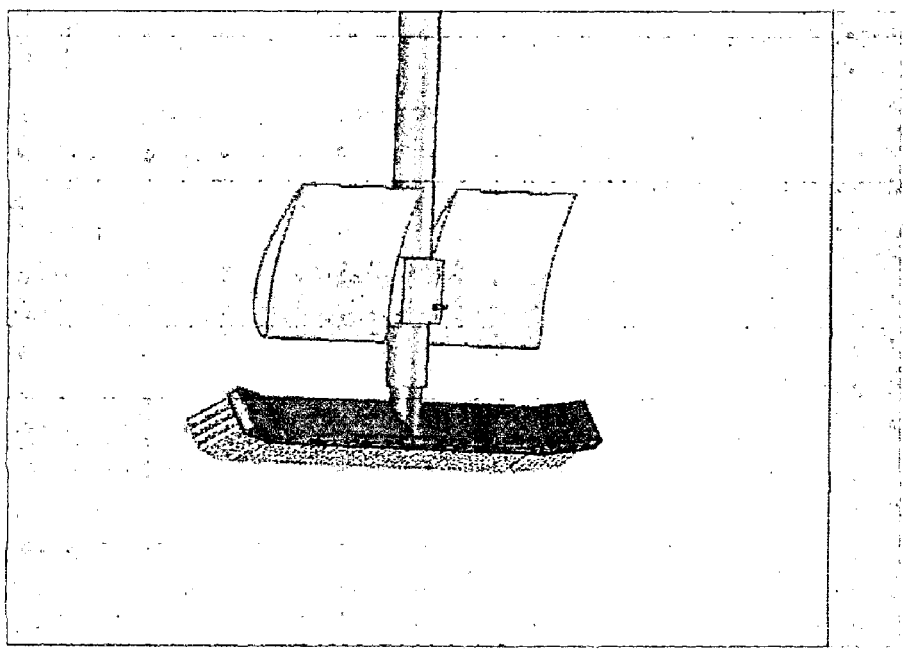
Figure 11 Isometric View of Plane Magic mounted to Pole Angled correctly (-15°) for cleaning Pool Side
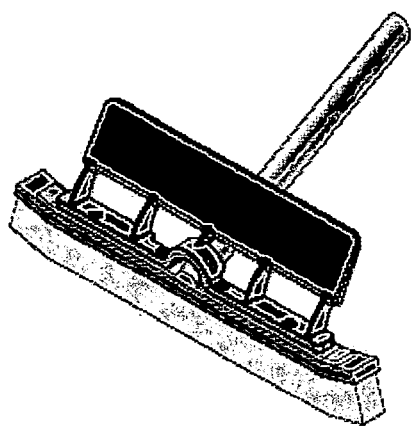
Figure 12 Embodiment of Prototype Showing
Teardrop Cross-Section Mounted To Backplane of Brush
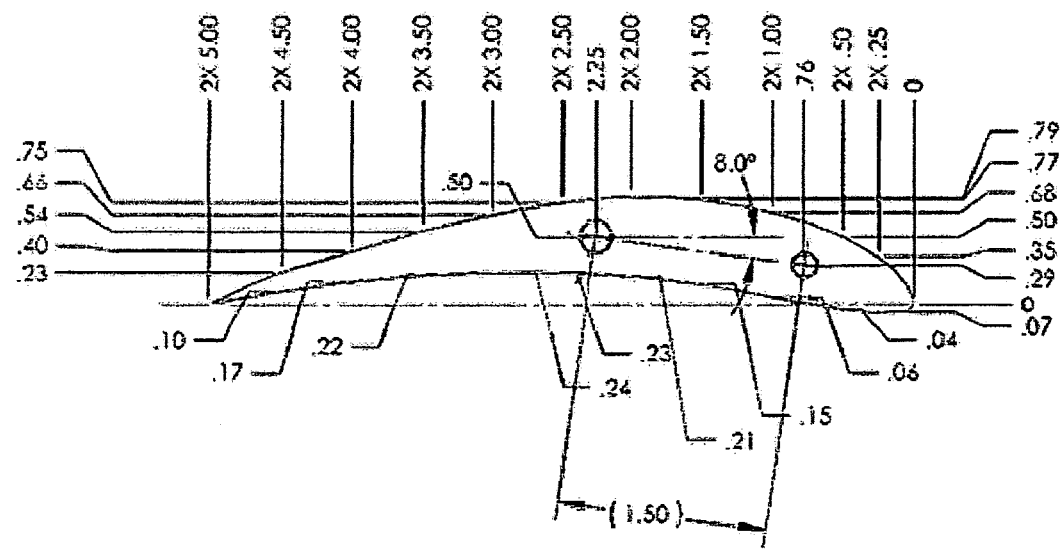
Figure 13 Eppler 423 Hydrofoil in Cross Section

PLANE MAGIC A.K.A. POOL PLANE

CROSS REFERENCE TO RELATED APPLICATIONS

This application claims the benefit of provisional patent application Ser. No. 60/755,450, filed Jan. 3, 2006 by the present inventor.

FEDERALLY SPONSORED RESEARCH

Not Applicable

SEQUENCE LISTING

Not Applicable

BACKGROUND OF THE INVENTION

1. Field of the Invention

The present invention relates to the means for applying forces to brushes for cleaning underwater surfaces and particularly to brushes that incorporate hydrodynamic planes for increasing contact pressure against a surface being cleaned by motion of an abrasive cleaning device.

2. Prior Art

Periodically, it becomes necessary to clean the walls of swimming pools from accumulated foreign matter such as algae, dirt and scum such as body oil or sun screen. In order to clean the walls of such accumulations, the wall surfaces must be periodically and frequently cleaned by manual scrubbing of the surface with a stiff bristled brush. Long poles are attached to a brush to enable an operator to extend the brush to the bottom of the pool walls, typically 10-15 feet into the typical residential pool. To clean underwater surfaces, a substantial physical force must be exerted since the operator must manipulate the brush by moving the pole about. The deeper the brush is submerged, the more difficult it is for the operator to manipulate the cleaning device. In addition, a brush must be forced against the surface of a pool wall in order to clean the wall.

Brushing vertical walls is particularly difficult because the operator must stand at the edge of the pool and continually force the brush against the pool wall. The difficulty is greatly compounded because of the precarious nature of standing at the edge of a pool when cleaning.

Prior art has addressed this need by suggesting the use of planes or foils attached to a brush or pole for exerting force against the brush as it is moved through the water in the pool. The following is a list of relevant patents issued in the last twenty years.

| Name | U.S. Pat. No. | Date |
| --- | --- | --- |
| 1. Feinberg | 4,637,087 | Jan. 20, 1987 |
| 2. Conrad | 4,733,427 | Mar. 29, 1988 |
| 3. Addona, Sr. | 4,742,592 | May 10, 1988 |
| 4. O'Callaghan | 4,783,868 | Nov. 15, 1988 |
| 5. Harrell | 4,962,558 | Oct. 16, 1990 |
| 6. Bean | 5,487,397 | Jan. 30, 1996 |
| 7. Landsman | 5,864,917 | Feb. 2, 1999 |
| 8. Meshulam | 5,983,431 | Nov. 16, 1999 |
| 9. Morse | 6,301,737 B1 | Oct. 16, 2001 |
| 10. Fortier | 6,668,413 B2 | Dec. 30, 2003 |

Characteristically, these prior art solutions have resulted in very inefficient force-producing schemes.

Review by Patent Number

Feiberg (U.S. Pat. No. 4,637,087) discloses a fixed water foil that has a rubber surface acting like a check valve. The foil angle is fixed. The foil only provides force when pushed, but not when pulled. A plurality of apertures is blocked by check valves so as to reduce the contact pressure on the return stroke.

Conrad (U.S. Pat. No. 4,733,427) discloses a hinged hydrofoil attached to a brush. The hydrofoil provides a down force when the brush is pushed and pivots in line with the pole when pulled. The angle of the hydrofoil is fixed. The hydrofoil is designed not to contact the surface when pulled. Addona, Sr. (U.S. Pat. No. 4,742,592) discloses the use of an attachment to a pool brush comprising a plate and special mounting hardware which assists in urging the bristles of the brush against the side wall while the brush is moved in an up and down motion. A portion of the energy exerted in this up and down motion is converted by this attachment to a force urging the bristles of the brush against the side wall. O'Callaghan (U.S. Pat. No. 4,783,868) discloses a free-rotating vane for an under liquid cleaning device. The vane pivots back and forth depending on the direction that the brush is pushed. Stops limit the angle that the plate can be positioned. In O'Callaghan, the stops are not adjustable. In addition, the vane contains holes that are merely made during the construction of the hinge. O'Callahan's holes are not constructed (i.e., sized, located or angled) for control of steering. Harrell, (U.S. Pat. No. 962,558) discloses a device for cleaning a submerged surface at a distance. The invention includes a pole, a tool attachment, a pivoting hydrofoil member for forcing said tool against said surface by providing hydrodynamic force and a jetting means for directing said fluid towards said surface when the tool is moved towards the operator. It includes a pole, a brush attachment, a hydrofoil member hingedly attached to the device and a jetting means. Bean (U.S. Pat. No. 5,487,397) discloses an attachment for use on a pool brush having hydrofoil with notch and resilient clip for mounting on the brush pole. The hydrofoil can pivot to apply contact force in either direction. Landsman (U.S. Pat. No. 5,864,917) discloses a vane pivotally held on either the brush head or the elongated handle of a brush pole. Each of the vanes pivots about an axis which is normal to the direction of motion when switching between upward and downward strokes. In particular, the vanes re-position to provide contact force during the retrieval stroke. Meschulam (U.S. Pat. No. 5,983,431) discloses an attachment for a pool brush having a hydrofoil with an upstanding fin fixedly connected to a base portion at approximately a right angle thereto Flow apertures along the upstanding fin operate together with the angular configuration of the upstanding fin and base portion to produce a transverse force when the pool brush is pushed in a downward motion. Morse (U.S. Pat. No. 6,301,737 B1) discloses a unique design in that there is no hydrofoil but rather a C-shaped scoop intended to allow foreign matter to escape from the edges of the scoop in the forward stroke while minimizing impedance during the retrieval stroke. Fortier (U.S. Pat. No. 6,668,413 B2) discloses a pool brush guide that utilizes a large hinged surface with adjustable stops to directly impede and redirect fluid flow for producing a transverse force. A last example exists in the form of the "Wall Whales®" (patent Pending) presently available on the market. The Wall Whale is a brush with essentially a large flat plate with a slight curve on the trailing edge. It uses an adjustable block between the plate and the pole for setting the angle of the plate with respect to the pole. Moving the block closer to the brush increases the angle. The plate is hinged at the backplane of the brush to allow rotation. There is no captive mechanism to hold the plate in place. Literature contained in the package makes the following claims:

1. "With the Wall Whale you simply push down with one hand and the force of the water against the Wall Whale does the work. As the Wall Whale moves through the water, it pushes against the pool surface with more than 10 times the force." (The picture shows the Wall Whale in use on the bottom of the pool.)
2. "Effortless flipping action eliminates drag on the upstroke and lifts the brush off the wall." (The picture shows the Wall Whale in use on the side of the pool)
3. "Brush your pool in about five minutes."
4. "Brush your pool thoroughly the first time using only one hand."
5. "Brushing the pool without the Wall Whale is strenuous and risks injury."

Actual use and analysis of this product has revealed the following:

1. It is impossible to use this product with one hand except momentarily. It requires two hands to position the Wall Whale on either the bottom or side of the pool and only then with some difficulty. The large hinged plate catches a lot of water and swings uncontrollably causing the user to exert additional effort to force it into position. Once there one hand can be used for the pushing stroke. But again there is a disadvantage. In order to generate ten times the force as claimed, the plate must be adjusted to a very high angle which causes an immense amount of drag. The sensation to the user is one of pushing a large bag of sand across the pool surface.
2. Drag is reduced by flipping action but the brush "flys" some distance away form the pool surface again causing the use of two hands to force the brush back into position.
3. Several attempts were made to brush a sixteen by thirty-two foot pool in five minutes. (The average size swimming pool is eighteen by thirty-six feet—Google) In five minute the walls were about two-thirds done. The bottom was never attempted.
4. Brushing the pool with the Wall Whale was strenuous due to the size of the plate and the fact that it is freely hinged and not controllable by the user.

SUMMARY OF DISADVANTAGES OF PRIOR ART

These patents disclose devices which are too complicated and expensive for practical application in the pool industry. Therefore, a need exists for a better design which will clean the side walls and bottom of the pool with less effort and yet be inexpensive to manufacture and purchase and easy to install without tools and easy to use.

1. Prior art is complex, comprised of numerous intricately machined metal parts.
2. Prior art has methods of attaching and removing the "hydrofoil" device from the pole which are time-consuming and difficult. This creates a need for separate poles for other, commonly used attachments such as skimmer nets or brush heads of different sizes or materials thereby increasing the overall cost to the user.
3. Prior art handicaps the operator by its weight and unnecessary surface area exposed to underwater motion. Since the device is attached to the furthest end of the pole near the broom, any additional weight or increased water resistance is greatly amplified and creates undue strain on the user.
4. Prior art includes surfaces which create water resistance when the brush is moved sideways which requires additional unnecessary effort.
5. Prior art has surfaces exposed to the flow of water during the push-pull operation that do not add to the desired contact force. This increases water resistance and consequently increases operator effort and fatigue with no improvement in the scrubbing action.
6. Prior art, in all cases, is composed of numerous operating parts, most of which are metal, that increase the chance of wear-out, corrosion and failure.
7. Most prior art utilizes a flat plane which has several design problems. When the foil is fixed it creates high drag and moves somewhat unpredictably when the pole is retrieved. When the foil is pivoted, the force of water is exerted on both sides of the pivot which creates control instability.
8. Metal parts will have a very short service life due to oxidation and chlorination.
9. Prior art includes metal assemblies that are large, heavy and cumbersome.

OBJECTS AND ADVANTAGES

Advantages

Objects and advantages of the present invention are to:
1. Provide a device to reduce effort, reduce time and reduce strain in the everyday job of cleaning a pool.
2. Provide additional leverage in distance cleaning such as in the middle of a large pool or at depth in a deep pool.
3. Advantages of Plane Magic include the following:
   a. No need to buy a new brush
   b. No need to replace Plane Magic when the present brush wears out
   c. Plane Magic transfers easily and quickly from one pool pole to another
   d. Plane Magic can be used with steel brushes—the Wall Whale cannot. It comes with a standard nylon bristle.
   e. Plane Magic adjusts easily and quickly with a snap of the planes from one position to the other giving optimal performance for side and bottom cleaning. Spring locking pins hold the planes in place at precisely the correct angle for maximum contact force and minimum drag.
   f. Plane Magic is lightweight, durable and is impervious to rust oxidation and the effects of chlorine.
   g. No assembly is required. Plane Magic comes as a finished assembly.
   h. Installation requires no tools. Plane Magic slides onto the pole and is hand tightened with two locking screws.
   i. Plane Magic allows for normal storage. It does not protrude in any way that would prevent storage of the pole and brush on standard wall mounting hardware.
   j. The Plane Magic design is highly producible using standard manufacturing techniques. It can be made entirely from plastic using stainless steel only in the ball-nose spring plunger.
   k. Plane Magic can be manufactured at a price competitive with other pool cleaning equipment.

SUMMARY

In accordance with the present invention, a hydrofoil assembly having a pair of planes, mounting collar, securing hardware and hydrofoil angle adjustment mechanism.

DETAILED DESCRIPTION

Figures

FIG. 1—Isometric view of the complete "Plane Magic" assembly

FIG. 2—Exploded View of Plane Magic Assembly showing Left Hydrofoil 15, Right Hydrofoil 21, Mounting Collar 17 and Associated Hardware FIG. 3—Isometric View of Left Hydrofoil 15 showing left hydrofoil leading edge 27, left hydrofoil spring plunger threaded blind hole 28, left hydrofoil mean camber line 29, left hydrofoil threaded pivot blind hole 30, left hydrofoil chord 31, left hydrofoil Eppler 423 upper curved surface 32, and left hydrofoil Eppler 423 lower curved surface 33

FIG. 4—Isometric View of Right Hydrofoil 21 showing the trailing edge 35, right hydrofoil chord 36, right hydrofoil Eppler 423 lower curved surface 37, right hydrofoil Eppler 423 upper curved surface 38, right hydrofoil mean camber line 39, right hydrofoil threaded pivot blind hole 40, right hydrofoil ball nose spring plunger threaded blind hole 41 and the right hydrofoil leading edge 42.

FIG. 5—Isometric view of mounting collar 17, showing mounting collar left hydrofoil pivot hole 43, mounting collar lower locking screw threaded through hole 44, mounting collar left hydrofoil spring plunger upper dimple 45, mounting collar left hydrofoil lower spring plunger lower dimple 46, mounting collar pole mount through hole 47 and mounting collar upper locking screw threaded through hole 48.

FIG. 6—Left and Right Hydrofoil Threaded Pivot 26, 22

FIG. 7—Upper and Lower Collar Locking Screw 25, 19

FIG. 8—Left and Right Hydrofoil Ball-Nose Spring Plunger 16, 20

FIG. 9—Diagram of Plane Magic Mounted to Pool Brush Held in Operating Positions

FIG. 10—Isometric View of Plane Magic mounted to Pole Angled correctly (+150) for cleaning Pool Bottom FIG. 11—Isometric View of Plane Magic mounted to Pole Angled correctly (−15°) for cleaning Pool Side FIG. 12—Embodiment of Prototype Showing Teardrop Cross-Section Mounted To Backplane of Brush FIG. 13—Eppler 423 Hydrofoil in Cross Section

DRAWINGS

Reference Numerals 15. left hydrofoil
16. left hydrofoil ball-nose spring plunger
17. mounting collar
18. mounting collar right hydrofoil lower blind hole
19. mounting collar lower locking screw
20. right hydrofoil ball nose spring plunger
21. right hydrofoil
22. right hydrofoil threaded pivot
23. mounting collar right pivot blind hole
24. mounting collar right hydrofoil upper blind hole
25. mounting collar upper locking screw
26. left hydrofoil threaded pivot
27. left hydrofoil leading edge
28. left hydrofoil spring plunger threaded blind hole
29. left hydrofoil mean camber line
30. left hydrofoil threaded pivot blind hole
31. left hydrofoil chord
32. left hydrofoil Eppler 423 upper curved surface
33. left hydrofoil Eppler 423 lower curved surface
34. left hydrofoil trailing edge
35. right hydrofoil trailing edge
36. right hydrofoil chord
37. right hydrofoil Eppler 423 lower curved surface
38. right hydrofoil Eppler 423 upper curved surface
39. right hydrofoil mean camber line
40. right hydrofoil threaded pivot blind hole
41. right hydrofoil ball-nose spring plunger threaded blind hole
42. right hydrofoil leading edge
43. mounting collar left hydrofoil pivot hole
44. mounting collar lower locking screw threaded through hole
45. mounting collar left hydrofoil spring plunger upper blind hole
46. mounting collar left hydrofoil spring plunger lower blind hole
47. mounting collar pole mount through hole
48. mounting collar upper locking screw threaded through hole

DETAILED DESCRIPTION

Preferred Embodiment

A preferred embodiment of the Plane Magic assembly mounted to a standard pool cleaning pole is given in FIG. 1. The part is comprised of two main sections:
  Hydrofoil with ball-nose Plunger and rotatable pivot
  Mounting Collar with screw clamps and hydrofoil position locks The hydrofoil is an inverted wing that makes use of both a vector component of the water flow on the hydrofoil and negative lift resulting from the cambered curved surfaces. The hydrofoil is mounted at a critical angle which is defined as:
  The angle of the hydrofoil relative the pool bottom or pool side which provides maximum contact force at minimum drag The essence of this invention is the Eppler 423 foil scaled down so as to suitably fit on a standard pool cleaning pole which normally acts as a long handle to a pool brush. The hydrofoil has the elements of a leading edge, span, trailing edge, camber, chord and variable thickness. (Chord is defined as a straight line connecting the leading and trailing edges.)

1. The left hydrofoil 15 has the cross-section of an Eppler 423 wing. It can be made of any lightweight, deformable material with negative buoyancy, however a material should be chosen that is suitable for use in chlorinated water. The left hydrofoil 15 is rectangular in shape, has a leading edge 27 asymmetrically curved upper surface 32 and lower surface 33, a trailing edge 34 and a mean camber line 29. The hydrofoil is square cut on the first and second end. The first end has a threaded pivot blind hole 30 approximately mid-chord 31 to receive the threaded pivot 26 and a second blind hole 28 near the leading edge 27 to receive the threaded ball-nose spring plunger 16. The second end of the hydrofoil is finished in a flush cut perpendicular to the hydrofoil span.

2. The left hydrofoil pivot 26 is a stainless steel machined screw of sufficient length and diameter so as to withstand both nominal shear and torsional forces for the intended application and to remain impervious to water induced oxidation and deterioration due to chlorination 3. The left hydrofoil ball-nose spring plunger 16 serves as an angle position lock to firmly anchor the left hydrofoil 15 and right hydrofoil 21 at the critical angle once they have been turned so that their spring loaded ball can seat into the blind hole 45, 46 in the mounting collar 17.

4. The Mounting Collar 17 is a thick-walled hollow cylinder flattened on two sides. Each flat—one at the three o'clock position and one at the nine o'clock position—has one threaded hole 23, 43 to receive the pivot and a second pair of blind holes 45, 46 offset plus and minus fifteen degrees from the axis of the pole to receive the ball nose spring plungers 16, 20. The mounting collar is the adapter that holds the planes to the pole. It is a hollow tube of a diameter just slightly larger than the outside diameter of the pole (pole O.D plus 0.010") to allow for a slip fit over the pole. The mounting tube is held in place by two #10×½" stainless steel locking screws. Locking screws allow for sufficient tightening by hand thereby precluding the need for a tool.

5. The mounting collar upper locking screw 25 is a #10 stainless steel screw flattened on one end to allow for finger tightening as shown in FIG. 6. The upper locking screw 25 mates with the mounting collar upper locking screw threaded through hole 48 which as shown in FIG. 5.
6. The mounting collar lower locking screw 19 is identical to the mounting collar upper lock screw 25 except that it mates with the mounting collar lower locking screw hole 44
7. The right hydrofoil 21 is identical to the left hydrofoil 15 except it is on the right side of the pole as held by the user. The leading edge is forward and the hydrofoil is free to pivot into the +15 and −15 degree positions with respect to the pole.
8. The right hydrofoil threaded pivot 22 is a section of stainless steel all-thread that rotatably joins the right hydrofoil 21 to the Mounting Collar 17 as shown in FIG. 2
9. The right hydrofoil ball-nose spring plunger 20 is a threaded hollow cylinder that contains a spring and steel ball said ball held captive by a restricted opening on the first end and a slotted collar on the second end as shown in FIG. 7.
10. The left hydrofoil threaded pivot blind hole 30 is a threaded blind hole of suitable diameter and depth to receive the left hydrofoil threaded pivot 26.
11. The mounting collar left hydrofoil ball-nose spring plunger upper dimple 45 and lower dimple 46 are concave recesses in the mounting collar matched in diameter and depth to receive the left hydrofoil ball-nose spring plunger 16.
12. The left hydrofoil leading edge 27 is a curved surface at the forward boundary of the hydrofoil that initiates the subsequent curves for the upper Eppler 423 32 and lower Eppler 423 33 contours.
13. The left hydrofoil trailing edge 34 is the aft most hydrofoil edge formed by the intersection of the Upper and Lower surfaces.
14. The left hydrofoil Eppler 423 upper curved surface 32 is the upper hydrofoil surface that conforms to the equation defining an Eppler 423 surface. A quantized version is given in two dimensions in FIG. 13. A third dimension is unnecessary since the cross-section is constant throughout the span of the plane.
15. The left hydrofoil Eppler 423 lower curved surface 33 is the lower hydrofoil surface conforming to the equation defining an Eppler 423 surface. A quantized version is given in two dimensions in FIG. 13. A third dimension is unnecessary since the cross-section is constant throughout the span of the plane.
16. The mounting collar left hydrofoil pivot hole 43 is a threaded blind hole matched to the threaded pivot in diameter and depth.
17. The mounting collar upper locking screw hole 48 is a threaded through hole matched to the threaded mounting collar upper locking screw 25 in diameter, pitch and depth.
18. The mounting collar left upper spring plunger blind hole 45 and mounting collar left lower spring plunger blind hole 46 are circular recesses of sufficient diameter so as to receive the hydrofoil ball nose spring plungers 16, 20 and are deep enough to provide a positive lock. The hydrofoil ball nose springs are of sufficient strength to forcibly engage the hydrofoil ball nose in the blind holes 45, 46 and keep them there under normal user input.
19. The mounting collar pole mount through hole 47 is a smooth bore through hole whose inside diameter is the outside diameter of the common pool brush/net pole plus a few 0.010 inches to allow for a slip fit onto the pool pole.
20. The mounting collar lower locking screw threaded through hole 44 is a threaded through hole matched to the mounting collar lower locking screw 19 in diameter and depth.
21. The right hydrofoil ball-nose spring plunger blind hole 41 is a threaded blind hole matched to the outside diameter of the right hydrofoil ball-nose spring plunger 20 and of slightly longer length to allow for screwing in the spring plunger without bottoming out.

Operation

Plane Magic attaches to any standard size pool pole. By use of hydrodynamic force it amplifies down force to whatever is attached to the pole typically a pool brush. Once attached, the brush will be used in similar fashion to any pool brush.

Detailed steps are as follows:

1. Attach Plane Magic to the pole
2. Set the planes to −15 degrees for scrubbing the side of the pool. (See FIG. 9, Detail A and FIG. 11.) The hydrofoil angle is set by firmly grasping the hydrofoil and twisting it to the desired position. By applying sufficient force, the ball nose spring plunger is made to retract from its present position and will re-engage in the new position.
3. Step to the edge of the pool.
4. Position the brush against the side of the pool so the planes are just below the water surface.
5. Give the pole a firm steady downward thrust—one hand is all that is necessary. As soon as the foil achieves relative motion through the water, lift in the direction of the brush causes the brush to press firmly against the side of the pool
6. At the end of the stroke turn the wrist one quarter turn and begin to withdraw the brush upward. For a right handed person this would be a one quarter turn to the left.
7. A foot or two before the planes reach the water surface give a one quarter turn to the right and gently maneuver the pole to position the brush one brush width over in preparation for the next swath. This maneuver quickly becomes intuitive.
8. Step over to stand directly behind the pole while it is hanging vertically and repeat steps 5 through 8.
9. Continue until the sides of the pool are clean and free from surface dirt and algae.
10. The greatest advantage is gained when brushing the sides of deep pools where leverage is almost completely lost once the brush moves a few feet below the surface. Here the hydrofoil bites forcefully into the water to transmit strong perpendicular contact force to the brush. The user experiences no additional work. Working in shallow or deep water the user need only give a firm steady push while remaining comfortably standing. There is no need to bend over to gain leverage.
11. To scrub the bottom of the pool re-set the planes to +15 degrees. See FIG. 9, Detail B and FIG. 10.
12. Adjust the pole length as necessary for the size of the pool being cleaned.
13. Step to the side of the pool.
14. Allow the brush to rest on the bottom of the pool.
15. Withdraw the pole slightly then give the pole a firm steady thrust forward—only one hand is necessary.

16. At the end of the stroke withdraw the pole. The brush will tend to rise. Give a one-quarter turn to the right. The brush will stop rising and float just over the pool bottom. The one quarter turn will kill most lift of the hydrofoil by bringing it to the vertical position thereby causing it to rise only slightly and moving it over slightly while it is being retrieved.
17. Just before the end of the withdrawal stroke give a one quarter turn to the left while maneuvering the pole slightly to position the brush one brush width over.
18. Step over just enough to be directly in line with the pole in preparation for brushing the next swath.
19. Repeat steps 14 through 17 until the pool bottom is clean and free from debris and algae. (If there are particles on the pool bottom it would be advisable to brush them toward the main drain.)
20. The greatest benefit is gained while cleaning large pools where the pole is adjusted to eight feet or more. It is very difficult and strenuous for the user to apply sufficient cleaning force. The hydrofoil however continues to provide significant down force regardless of pole length. The user will experience effort to clean the middle of a large pool. A firm steady push on each stroke will result in constant effective scrubbing force over the entire pool surface.

Additional Embodiments

Prototype

This application differs from the provisional application in two ways. In the original design the hydrofoil was positioned on struts above and behind the brush and above the pole. This location provided the additional contact force sought after but made storage difficult. Pool poles are designed to mount on J-hooks readily available in most retail pool equipment outlets. The J-hooks mount to the side of any building or vertical fence and receive the pole with brush attached. The pole is positioned so that the brush is away from the wall and the pole can lie flush against the wall. The original design was such that the brush protruded from one side while the hydrofoil protruded from the other. This prevented proper mounting of the assembly in the J-hook. The current overcomes this problem by mounting the hydrofoil flush with the pole as shown in FIG. 10. The pole can now be stored brush out as is normally done. A flat-sided teardrop prototype using ABS was made in a stereo lithography machine. The prototype was made as a flat-sided teardrop (in cross section) to allow for precise control of the angle of attack. It was made as a separate piece part with the necessary screw holes to mount to an existing brush. The model joined with an off-the-shelf brush is shown in FIG. 12. It was used to demonstrate proof of concept and did in fact significantly reduce the amount of effort required to clean a given portion of the pool bottom and side walls without excessive drag. It was light, easy to handle and using a one-quarter turn, offered no particular difficulty during the retrieval stroke. The production version will be a single piece part of high strength polymer consisting of a foil, pole mount, struts and backplane into which bristles will be attached.

Alternative Embodiments

None

Advantages
1. There is no assembly and no attachment.
2. No parts are required.
3. No tools are required
4. No plans or assembly instructions are required 5. The entire brush is molded as a single piece part. It need only be attached to the pole in the same manner as all existing brushes.
6. There are no metal parts to decay from oxidation and chlorination.
7. The assembly is light and compact due to the use of high strength polymer rather than metal.
8. The hydrofoil is an actual hydrofoil with engineered leading and trailing edges, camber, curvature and chord. By generating negative lift in addition to vector thrust, highly effective scrubbing action is achieved in a small package.
9. The hydrofoil is designed to operate at a critical angle (highest lift to drag ratio) to provide effective scrubbing action on both the bottom and sides of the pool. The retrieval stroke is controlled by a simple one-quarter turn of the pole by the user thereby orienting the assembly into a vertical position. The assembly will rise slightly until motion ceases then it will fall easily to the bottom of the pool. The user then provides a one-quarter turn in the opposite direction to make the brush parallel to the pool bottom before it makes contact. An additional benefit is that when the brush is turned sideways it falls primarily downward but at the same time moves slightly sideways automatically positioning itself for the next swath.
10. The planes are scalable. They may be manufactured larger or smaller to provide a force that is both comfortable and effective for the user.

CONCLUSIONS, RAMIFICATIONS AND SCOPE

This invention is unique from all others in that it uses a curved hydrofoil rather than a plate. This curve is an efficient geometry and has a different lift equation than the flat plate used in most other prior art. For a given size, geometry, velocity and angle of attack, a curved hydrofoil will generate much more force than a flat plate.

The lift equation for a curved surface is:

$$L_C = C_L * \tfrac{1}{2} * \rho * V^2 * S$$

Where
$C_L$ or coefficient of lift is a function of $\alpha$, S and fluid viscosity
$\alpha$=angle of attack
$\rho$=fluid density
V=velocity
S=foil surface area The lift equation for a flat plate is $$L_P = *2*\pi*\sin\alpha*\cos\alpha*\tfrac{1}{2}*\rho*V^2*S \quad (1)$$

The term $\tfrac{1}{2}\rho*V^2*S$ is defined as dynamic pressure q. Since it is the same for both the flat plate and the Eppler hydrofoil it may be disregarded for the following comparison.

Drag is given as $$D_P = 2*\pi*(\sin\alpha)^2 \quad (2)$$

A measure of efficiency is the ratio of lift to drag, L/D

Then at $\alpha = 10°$ $$L_P(10°)/D_P(10°) = (1)/(2) = (\sin\alpha*\cos\alpha)/(\sin\alpha*\sin\alpha) = (\cos\alpha/\sin\alpha) = \cot(10°) = 5.67 \quad (3)$$

Lift and drag for the Eppler 423 is given in the drag polar as coefficient of lift and coefficient of drag. The ratios of the coefficients are the same as the actual values for lift and drag. It is therefore determined that at $$\alpha = 10° \quad (4)$$

$$C_{LE}=1.2 \quad (5)$$

$$C_{DE}=0.04 \quad (6)$$

$$C_{LE}/C_{DE}=(4)/(5)=1.2/0.04=30 \quad (7)$$

It can be readily seen that both a flat plate and a cambered surface generate lift in proportion to angle of attack. The difference is that the flat plate generates much more drag at any given angle which is why the Wall Whale offers so much resistance to the user. The higher the number of L/D the greater the efficiency as this implies that lift is increasing at a faster rate than drag as angle of attack increases. Percent improvement is given below:

$$\Delta\%=(30-5.67)/5.67*100=430\%$$

The Eppler hydrofoil is four hundred thirty percent more efficient than a flat plate.

Reduction in drag at 10° is:

$$D_P/C_{DE}=2*\pi*(\sin*10°)^2/0.04=4.75$$

The Eppler requires only 21% of the effort required by the Wall Whale® to do the same amount of work.

Plane Magic is significantly different from prior art in the following respects:

a. Use of a hydrofoil rather than a plate. The mathematics is different leading to different behavior.
b. A rigid hydrodynamic surface versus one that is hinged.
c. Pole mount versus brush mount
d. Useful life completely independent from the life of the brush which typically has a service life of two to three years.
e. Affordability—can be made of any shapeable material but is a prime candidate for high pressure injection plastic molding similar to other pool cleaning products
f. Ease of installation—mounts with two locking screws
g. No metal parts to corrode or oxidize The current design suffers none of the aforementioned deficiencies. It has the following advantages:

1. Simplified universal installation mounts to new or existing equipment. No need to go out and buy new. Readily mounts to standard pool poles and needs no replacement when the brush wears out.
1. Rigid construction—allows precise control of the brush. No oversized hinged plate that flops uncontrollably when maneuvering the brush into position causing additional effort and fatigue. With a little pushing and twisting of the wrist present design is very easy to steer into position. Hydrofoil design produces high contact force with small surface area reducing drag and increasing maneuverability.
2. Streamlined design—allows storage on standard J-hooks readily available at pool equipment outlets.

I claim:

1. An apparatus for attachment to and use with a pool brush including an elongated handle and a brush head at an end thereof, said apparatus comprising:

a. a generally cylindrical mounting collar including a through hole adapted to receive the handle of the brush so that the mounting collar may be slid along the length thereof, the mounting collar further including at least one locking screw for securing it in place on the brush handle, said mounting collar further including first and second opposites sides with a pivot hole within each of the sides, each side of the mounting collar further including a pair of dimples;

b. first and second hydrofoils each pivotally attached to a respective side of the mounting collar by a pair of pivot members associated with a respective one of the pivot holes of the mounting collar, each of the hydrofoils adapted to pivot about an axis substantially perpendicular to the axis of the brush handle when mounted thereon, each of the hydrofoils including a retaining means adapted to engage a selected one of the pair of dimples on each side of the mounting collar for allowing the user to select and fix a desired hydrofoil angle for the surface to be cleaned.

* * * * *